No. 608,803. Patented Aug. 9, 1898.
J. A. SNYDER.
ELASTIC TIRE FOR WHEELS.
(Application filed Dec. 13, 1897.)
(No Model.)
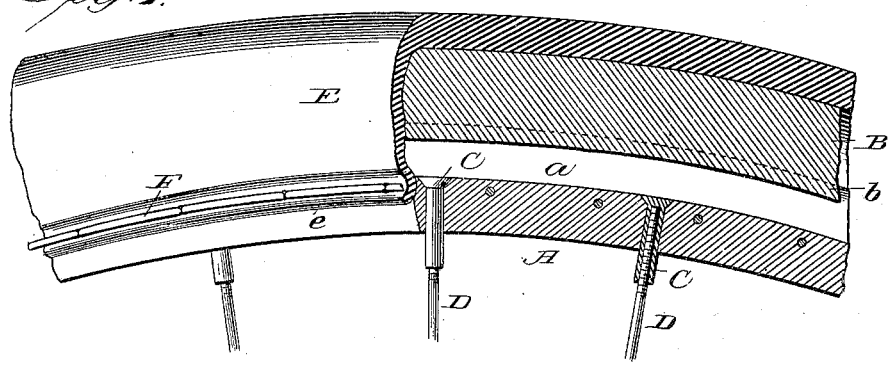
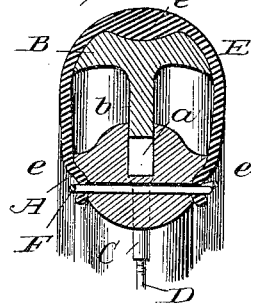
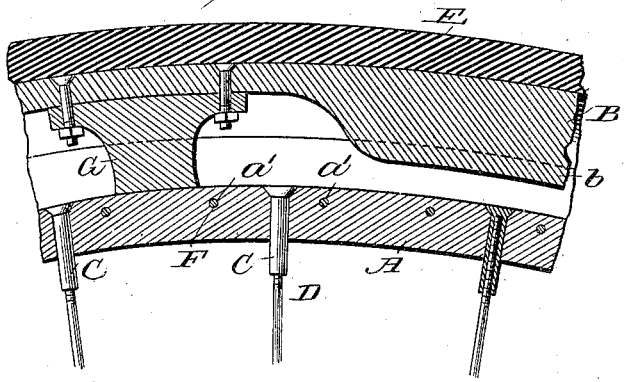
Witnesses
Inventor
James A. Snyder
Attorney

UNITED STATES PATENT OFFICE.

JAMES ALVIN SNYDER, OF TRENTON, NEW JERSEY.

ELASTIC TIRE FOR WHEELS.

SPECIFICATION forming part of Letters Patent No. 608,803, dated August 9, 1898.

Application filed December 13, 1897. Serial No. 661,602. (No model.)

*To all whom it may concern:*

Be it known that I, JAMES ALVIN SNYDER, a citizen of the United States, residing at Trenton, in the county of Mercer and State of New Jersey, have invented certain new and useful Improvements in Elastic Tires for Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to rims and tires for bicycles and other vehicles; and its object is to provide an elastic tire which shall be free from the well-known objections to tires of the pneumatic type and yet have the easy-riding qualities of such tires.

To this end the invention consists in certain improvements in that class of wheels wherein two rigid rims, one of greater diameter than the other, are held in normally concentric relation by means of an elastic cover secured to both of them, said cover permitting a certain amount of play or relative movement between the rims when the wheel is in use. The specific improvements which form the subject-matter of this application are hereinafter described, and particularly pointed out in the claims.

In the drawings, Figure 1 is a side elevation, partly broken away, of a portion of a wheel embodying my improvements. Fig. 2 is a cross-section thereof. Fig. 3 is a longitudinal section showing a modified construction.

The rims A and B are preferably made of wood, cane, or the like, the inner rim A having radial countersunk holes for the reception of the headed cap-nuts C, into which the outer ends of the wire spokes D are screwed. This rim A is shown in the drawings as provided with a longitudinal groove $a$ in its outer surface, said groove having parallel side walls, as clearly shown in Fig. 2. The other rim B has an internal longitudinal rib $b$, having parallel sides and fitting easily in the groove $a$, so as to be capable of sliding in and out of the same. This rib and groove keep the two rims in the same plane and prevent relative lateral movement.

An elastic cover E, U-shaped in cross-section and made, preferably, of vulcanized rubber or a combination of rubber and canvas, envelops the outer rim and extends inwardly, so as to inclose the inner rim within its edges $e$. The inner rim is preferably provided with grooves along its sides for the edges of the cover E, in which are eyelets $e'$ to receive lacings F, by means of which the cover is lashed to the rim. These lacings may pass through transverse holes $a'$ in the rim, as shown in the drawings, or they may pass over the inside of the rim, as will be readily understood. The tread portion $e^2$ of the cover is preferably thickened, as shown.

It will be seen that by means of this elastic cover the two rims are held normally concentric, but that the outer rim can yield when any weight is brought upon the wheel. In case it is desired to relieve the cover from too severe strains the rib $b$ can be cut away at intervals to permit cushions G, of rubber, to be inserted, secured to the outer rim, and projecting into the groove $a$, preferably to its bottom, as shown.

Having thus described my invention, what I claim, and desire to secure by Letters Patent, is—

1. In a wheel, the combination with an inner rigid rim having a groove in its outer surface, of an outer rigid rim having an internal longitudinal rib entering said groove, and means for elastically retaining said rims in a normally concentric position, substantially as described.

2. In a wheel, the combination with an inner rigid rim having a groove in its outer surface, of an outer rigid rim having an internal rib entering said groove, and an elastic cover enveloping both rims and secured to the inner one, substantially as described.

3. In a wheel, the combination with an inner rigid rim having a groove in its outer surface, of an outer rigid rim having an internal longitudinal rib entering said groove, and a U-shaped elastic cover enveloping said rims, with its edges secured to said inner rim, substantially as described.

4. In a wheel, the combination with an inner rigid rim having a groove in its outer surface, of an outer rigid rim having a rib entering said groove, said rib being cut away at intervals, elastic cushions secured to the outer rim in said cut-away places and projecting into said groove, and means for retaining the rims in normally concentric relation, substantially as described.

In testimony whereof I affix my signature in presence of two witnesses.

JAMES ALVIN SNYDER.

Witnesses:
 JOHN F. MELLISH,
 HARRY J. LEE.